METHOD OF MAKING A SEMICONDUCTOR BY IONIC BOMBARDMENT

Filed Dec. 24, 1964 2 Sheets-Sheet 1

INVENTOR

Kenneth E. Manchester

BY Connolly and Hutz

ATTORNEYS

METHOD OF MAKING A SEMICONDUCTOR BY IONIC BOMBARDMENT

Filed Dec. 24, 1964 2 Sheets-Sheet 2

INVENTOR

Kenneth E. Manchester

BY Connolly and Hutz

ATTORNEYS

United States Patent Office 3,390,019

Patented June 25, 1968

3,390,019
METHOD OF MAKING A SEMICONDUCTOR BY IONIC BOMBARDMENT

Kenneth E. Manchester, Williamstown, Mass., assignor to Sprague Electric Company, North Adams, Mass., a corporation of Massachusetts Filed Dec. 24, 1964, Ser. No. 421,061
4 Claims. (Cl. 148—1.5)

ABSTRACT OF THE DISCLOSURE

A planar semiconductive structure is produced by ion beam implantation of impurities in such a manner that no implantation extends to an edge of the body and each subsequent implantation is within the volume defined by a previous implantation.

This invention relates to a method of preparing semiconductive devices and to devices prepared thereby.

Semiconductive devices are prepared by the formation of junctions within or on the surface of monocrystalline semiconductive bodies, whereby a junction either represents an interface separating two parts of different conductivities in the body or forms the transition between a metallic body and the semiconductive body. If the conductivities are different in type, which means that one type has conduction by holes, the other one by electrons, the interface between the two parts of the body is called a P-N junction. If the conductivities are different in magnitude but not in type, the junction formed between the two parts is called a low-high junction.

The formation of junctions can be achieved by various processes, as for example by diffusion, alloying, or epitaxial growth. Inherent in all these processes are advantages and limitations; what process is used depends on the objectives to be achieved.

A prior art process for forming junctions wherein a beam of ions is directed onto the surface of a semiconductive body and wherein the ions are implanted into the body provides certain advantages. By either moving the beam across the surface, or by using suitable masks, junctions can be formed according to a pre-selected pattern. However, there are certain drawbacks connected with this process, including the damage done by the beam to the crystalline structure of the semiconductive body. This damage can be healed by a proper temperature treatment, e.g. by annealing at a temperature low enough to prevent motion of the implanted ions by diffusion. Another disadvantage of ion implantation is the difficulty in achieving a uniform layer out to the very edge of the semiconductive body. This difficulty has necessitated lapping of the edges of the body, thus contributing to additional processing steps.

Another prior art process for forming a junction according to a pre-selected pattern consists in the formation of a flat protective layer which adheres to the surface of the semiconductive body and masks parts of it against penetration by an impurity. The term impurity as used herein is understood to be a material which changes the conductivity of the semiconductive body either in type or in magnitude. By exposing the body to the vapor of an impurity, the latter penetrates into the body at the unmasked parts and forms a junction therein. Junctions generated this way intersect the flat surface to which the mask was applied; a device containing such junctions is called a planar device. These planar junctions separate a pocket of the semiconductive body from the rest of the body. The repeated application of different masks and diffusion steps allows for more complicated junction patterns where, for example, within one pocket another pocket of the opposite conductivity type is formed. If the conductivity type of the first pocket is opposite to the conductivity type of the body, a structure is obtained which by proper contacts to the diffused areas can function as a transistor. The smaller pocket represents a resistor when it has narrow dimensions in one direction and long extended dimensions in the other direction. Similarly, a variety of other structures can be formed by this planar process. Advanced device technology is achieved when these structures are put together in a single body of a high component density wherein the structures are suitably interconnected.

However, the prior art method for fabricating planar devices presently requires repetition of three basic steps of forming an adherent protective layer, photoresist masking, and diffusion. In addition a final step is required involving the deposition of a metal film for forming ohmic contact to the device regions and also to provide interconnecting lands. Hence, it is seen that the prior art planar process suffers disadvantages including: the number of handling steps is large; the cleaning steps which attempt to maintain uncontaminated reproducible surfaces are numerous; the method is highly dependent on photoresist masking to open diffusion windows of precise geometrics in the adherent protective layer; reformation of adherent protective layers is necessary after each prediffusion to provide a mask base for the next diffusion; and the diffusion is a compound process with final junction geometry a function of all steps.

From the foregoing it is seen that normal present-day processing of components and integrated circuits involves a very large number of individual steps, most of which require changes in ambient conditions and consequent exposure to contamination and degradation. The result of this complexity is low yields which cause high unit cost and reduced reliability.

The formation of planar junctions by ion implantation by moving an ion beam over pre-selected areas of the flat surface of a semiconductive body would reduce the number of handling steps in the prior art planar process described above because the photoresist masking would become unnecessary. According to the aforementioned damage and control drawbacks arising from ion implantation, however, this method would not seem to be suitable to form planar devices. It is known, furthermore, that if a sample is presaturated by an ion implantation, very complex processes take place during any subsequent exposure to an ion beam. The ions which are to be implanted during second exposure display easily the tendency to stay in the neighborhood of the surface if not high enough ion beam energies are applied to give them a sufficient penetration. Too high an ion beam energy, on the other hand, causes a loss of atoms from the sample.

Because the planar method can be utilized with special advantage when at least two pockets are formed with one pocket partially or completely overlapping the other, it is of advantage to provide means to form the same structure by the application of ion beams.

It is an object of this invention to prepare planar devices by the method of ion beam implantation.

It is another object of this invention to form several devices within the same block of semiconductive material by ion beam implantation.

These and other objects of this invention will become apparent from the following description and the accompanying drawing, in which.

In general, the objects of this invention are attained by a method and means involving a plurality of ion implantations to provide one pocket within another in a semiconductor body. It is, therefore, a feature of the invention that parts of the surface of a semiconductive body according to a pre-selected pattern are exposed in at least two subsequent steps to ion beams in such a way that no beam contacts an edge of the body, and that each of the beams covers an area which partially or completely overlaps an area covered by at least one other ion beam. The ion beams must be of such a nature that they contain a material which penetrates into the interior of the body, causing therein a conductivity change.

Figure 1:
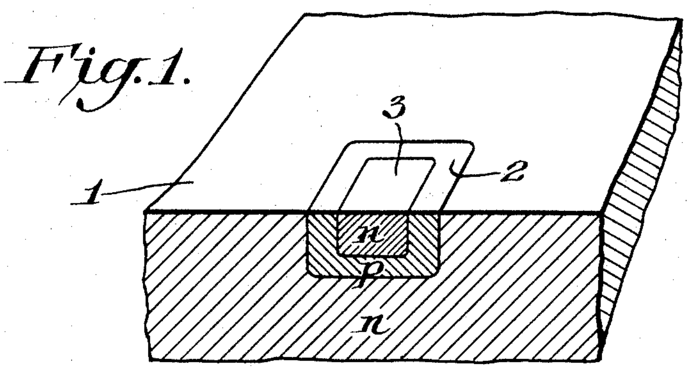
FIGURE 1 is a perspective, partly in section, of one embodiment of this invention.

In FIGURE 1, the flat surface of an N-type semiconductive body 1 is exposed first to ion beams which forms a pocket 2 and causes therein a conductivity change from N and P. Another exposure to a subsequent ion beam containing ions of an N-type impurity leads to an N-type pocket 3 within pocket 2, thus forming a transistor structure.

Figure 2A:
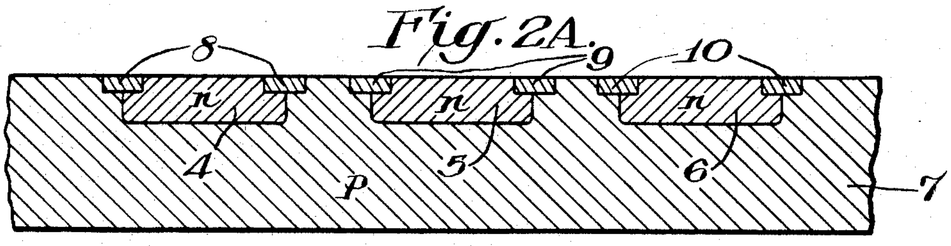
FIGURE 2A is a cross-section of a plurality of implanted pockets in a single slice.
Figure 2B:
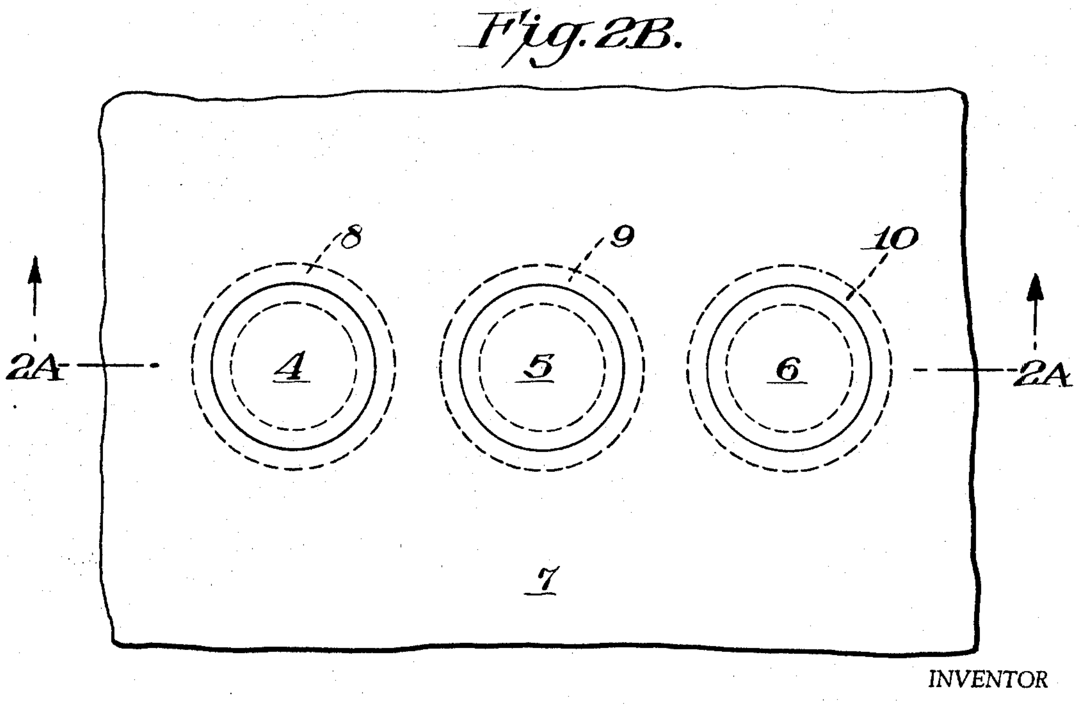
FIGURE 2B is a plan view of the structure of FIGURE 2A.

FIGURE 2A gives a cross-sectional view of several N-type pockets 4, 5 and 6 which were implanted by an ion beam into a P-type semiconductive body 7. FIGURE 2B represents a top view of the structure given in FIGURE 2A. Ring-shaped pockets 8, 9 and 10 are formed by another ion implantation to greatly reduce leakage current between the pockets 4, 5 and 6.

Figure 3A:
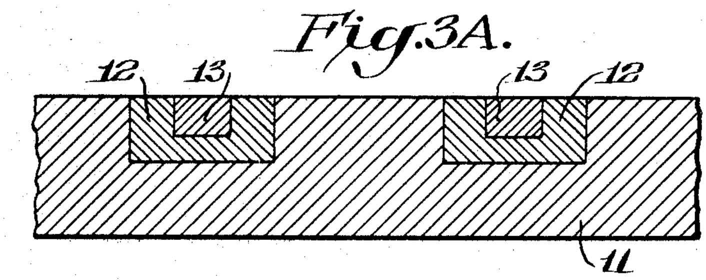
FIGURE 3A is a cross-section of plural pocket structure of a resistor embodiment of this invention.
Figure 3B:
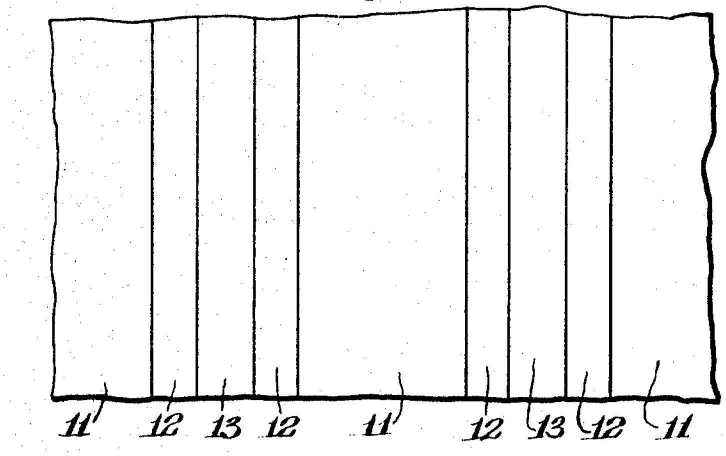
FIGURE 3B is a plan view of the structure of FIGURE 3A.

FIGURES 3A and 3B are a sideview and a topview, respectively, of a structure which can be utilized as a semiconductive resistor. Within the P-type semiconductive body 11 a long stretched N-type pocket 12 is formed by a first ion implantation. Within pocket 12 the actual resistor is formed by ion implantation of pocket 13. The pocket 12 serves to isolate the resistor element of pocket 13 from other parts of the semiconductive body.

This invention generally consists in the application of ion beam implantation for the formation of planar structures wherein at least two subsequent steps of ion beam implantation are applied in such a way that each of the ion beams cover an area which partially or completely overlaps an area covered by another ion beam. It is this feature which significantly contributes to advanced technology in the formation or production of devices and circuits. For one who knows the arts of planar devices with integrated masks it is evident that this invention saves many steps which were heretofore considered to be necessary to form the device.

It is known that semiconductive devices can be damaged by radiation. Whether this radiation originates from experimental conditions or whether this radiation is natural does not matter. Certain device characteristics may deteriorate when the radiation occurs. According to this invention, workable devices would be obtained even when the damage was not healed. Such devices preferably may be used then when conditions can be expected which would lead to radiation damage. In this case, the conditions would not change the characteristics of the device at all.

It could be, furthermore, learned that when the semiconductive body was at higher temperatures during the ion implantation there was a healing effect on the damage done by the implantation. The healing can be either achieved by additional means as, for example, a heater strip on which the semiconductive body is mounted or by using an ion beam energy density which is high enough to heat the sample by the impact of the ions. The energy density can be varied conveniently by changing two or more ion beam parameters, namely accelerating potential, current or time.

The method may be used, furthermore, in conjunction with other methods in a way that after the semiconductive body has been subjected to two or more ion implantations, a temperature treatment is applied for so long a time that substantial diffusion of the implanted ions is achieved. Such a method can be used with advantage then, when the implanted ions are of different conductivity type and differ in their diffusion coefficients to such an extent, that for normal diffusion temperatures and times there is a substantial difference in penetration depth, thus giving rise to two junctions. Furthermore, the semiconductor may be held at such a temperature during the ion implantation that there is an enhanced penetration of the implanted ions.

The concentration distribution which results from ion implantation is represented by a bell-shaped curve. By the combination of two of these distributions, gradients at the junctions may be obtained, which permit device characteristics heretofore unknown.

Figure 4A:
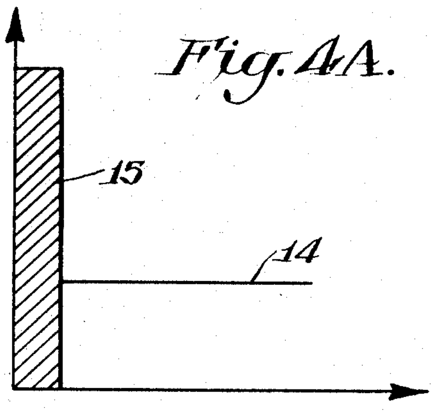
FIGURE 4A is a representation of the impurity distribution in a semiconductor body produced according to this invention; and, FIGURE 4B is a plot of the concentration distribution of the body after diffusion.
Figure 4B:
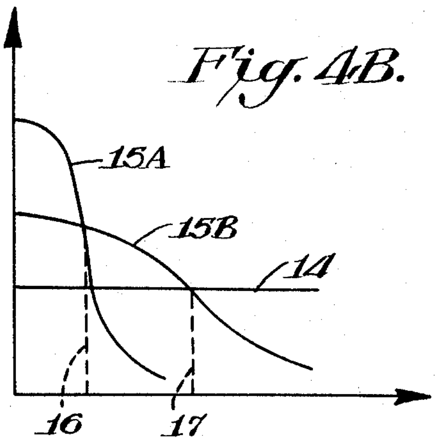

FIGURE 4A shows the approximate concentration distribution in a semiconductive body after two subsequent ion implantations. The horizontal axis represents the penetration depth (not to scale) and the vertical axis represents the concentration. The horizontal line 14 indicates the background doping level of the semiconductive body. Within the rectangle 15 the bulk (about 60%) of the implanted ions may be contained. After subjecting the sample to diffusion under the above mentioned conditions a concentration distribution results as shown in FIGURE 4B. There 15A is the concentration distribution of the slow diffusing impurity and 15B the distribution for the fast diffusing one. As one can see, two junctions 16 and 17 are formed under these circumstances. Such a structure after proper contacting can be utilized, e.g. as a transistor.

While the plane of the semiconductive body onto which the ion beams are directed is not of the essence of this invention, it has been found that the deepest penetration in accordance with this invention has been in the <110> direction. It will be understood that the lateral area of the pockets formed by the ion beams is controlled by focusing the beams in accordance with known practices in the art.

The following specific examples will be understood to be illustrative only, and in no way limitative of the method and device of this invention.

Example I

A 0.03 ohm-cm. P-type silicon substrate oriented in the <110> direction was implanted with 80 kilo electron volts (kev.) phosphorus ions to a dose of $5\times10^{14}$ ions/cm.$^2$ to produce a junction 10,300 A. below the surface, followed by implantation of 13.3 kev. boron ions to a dose of $5\times10^{14}$ ions/cm.$^2$ to produce a second junction 2620 A. below the surface within the first implanted volume.

Example II

A 0.03 ohm-cm. P-type silicon oriented in the <100> direction was implanted with 40 kev. phosphorus ions to a dose of $5\times10^{14}$ ions/cm.$^2$ to produce a junction 4800 A. below the surface followed by implantation of 13.3 kev. boron ions to a dose of $5\times10^{14}$ ions/cm.$^2$ to produce a junction within the first implanted volume 4430 A. below the surface.

Example III

A 0.03 ohm-cm. P-type silicon substrate oriented in the <110> direction was implanted with 80 kev. phosphorus ions to a dose of $5\times10^{14}$ ions/cm.$^2$ to produce a junction 10,600 A. below the surface followed by implantation of 26.6 kev. boron ions to a dose of $1\times10^{15}$ ions/cm.$^2$ to produce a junction within the first implanted volume 3300 A. below the surface.

In order to form structures according to this invention, a setup may be used which is familiar to workers in the art of ion beam implantation. The setup allows to achieve various device structures by changing certain parameters, such as the accelerating potential of the ions, the concentration of the ions, the kind of ions, the time, and the ion beam diameter. The kinds of ions may vary from beam to beam. Furthermore, one ion beam may contain two different kinds of ions at the same time. Or one can vary the beam diameter during the implantation process. It should be understood, furthermore, that the semiconductive material is not limited to silicon, but may consist, for example, of germanium or one of the III–V compounds.

Obviously, many modifications of the present invention are possible in the light of the above teachings. It is, therefore, to be understood that within the scope of the appended claims, the invention may be practiced otherwise than as specifically described.

What is claimed is:

1. A method of preparing within a semiconductor body a plurality of overlapping pockets having conductivities differing from one another and from said body, said method comprising directing a first ion beam of a first potential and dose directly onto a substantially central portion of a surface of said body wherein the extent of surface coverage is determined solely by said first ion beam, directing a second ion beam of a second potential and dose different from said first ion beam directly onto said portion of said surface wherein the extent of surface coverage is determined solely by said second ion beam, selecting said first potential and dose and said second potential and dose such that the volume of implant of one ion beam is wholly within the volume of implant of the other ion beam and wherein the ion beam of higher potential covers a greater extent of said surface, and providing said first ion beam and said second ion beam with impurity ions which cause conductivity changes within said pockets.

2. The method of claim 1 wherein at least one of said ion beams is regulated so that said semiconductive body is heated to a temperature where damage done to the crystal lattice of the body is healed out.

3. The method of claim 1 wherein said semiconductive body is subjected after the application of at least one of said ion beams to such a temperature and for so long a time that substitutional diffusion of the implanted ion is achieved.

4. The method of claim 1 wherein said semiconductive body is heated during at least one of the steps described to a temperature which allows for enhanced penetration of the ions.

References Cited

UNITED STATES PATENTS

| | | | |
|---|---|---|---|
| 2,787,564 | 4/1957 | Shockley | 148—1.5 |
| 3,200,019 | 8/1965 | Scott | 148—187 XR |
| 3,226,614 | 12/1965 | Haenichen | 148—33 |
| 3,293,084 | 12/1966 | McCaldin | 148—1.5 |

HYLAND BIZOT, *Primary Examiner.*